US008515189B2

(12) United States Patent
Pan et al.

(10) Patent No.: US 8,515,189 B2
(45) Date of Patent: Aug. 20, 2013

(54) IMAGE COMPRESSION METHOD WITH FIXED COMPRESSION RATIO, IMAGE DECOMPRESSION METHOD, AND ELECTRONIC DEVICE THEREOF

(75) Inventors: Chia-Ho Pan, Tainan (TW); Che-Wei Chang, Taipei (TW); Chin-Hao Tu, New Taipei (TW); Shuei-Lin Chen, Kaohsiung (TW)

(73) Assignee: Altek Corporation, Hsinchu (TW)

( * ) Notice: Subject to any disclaimer, the term of this patent is extended or adjusted under 35 U.S.C. 154(b) by 152 days.

(21) Appl. No.: 13/223,400

(22) Filed: Sep. 1, 2011

(65) Prior Publication Data

US 2013/0011061 A1      Jan. 10, 2013

(30) Foreign Application Priority Data

Jul. 6, 2011   (TW) .............................. 100123914 A

(51) Int. Cl.
*G06K 9/36* (2006.01)
*G06K 9/46* (2006.01)
(52) U.S. Cl.
USPC ......................................... 382/232; 382/233
(58) Field of Classification Search
USPC .................................. 382/173, 232, 233, 240
See application file for complete search history.

(56) References Cited

U.S. PATENT DOCUMENTS

| 5,991,515 A * | 11/1999 | Fall et al. ..................... 358/1.15 |
| 7,477,793 B1 * | 1/2009 | Boliek et al. .................. 382/240 |
| 8,121,417 B2 * | 2/2012 | Gering et al. ................. 382/232 |

* cited by examiner

*Primary Examiner* — Phuoc Tran
(74) *Attorney, Agent, or Firm* — Morris Manning & Martin LLP; Tim Tingkang Xia, Esq.

(57) ABSTRACT

An electronic device includes a multi-field sensor, a memory, and a codec wrapper module, in which the codec wrapper module includes at least one encoder and at least one decoder. The encoder compresses raw data of an image into an image bit stream with a compression ratio through the following steps. The image is segmented into various image bands. Storage space is allocated in the memory and is segmented into various compressed band regions according to the compression ratio and a bit stream length of the raw data. A starting position of each compressed band region is recorded as a current ending position. Lines, sequentially received, are compressed into compressed bit streams respectively. The compressed bit streams are sequentially written into the corresponding compressed band regions according to field indexes of the lines, an output field order, and a group formed by the image bands corresponding to the lines.

11 Claims, 8 Drawing Sheets

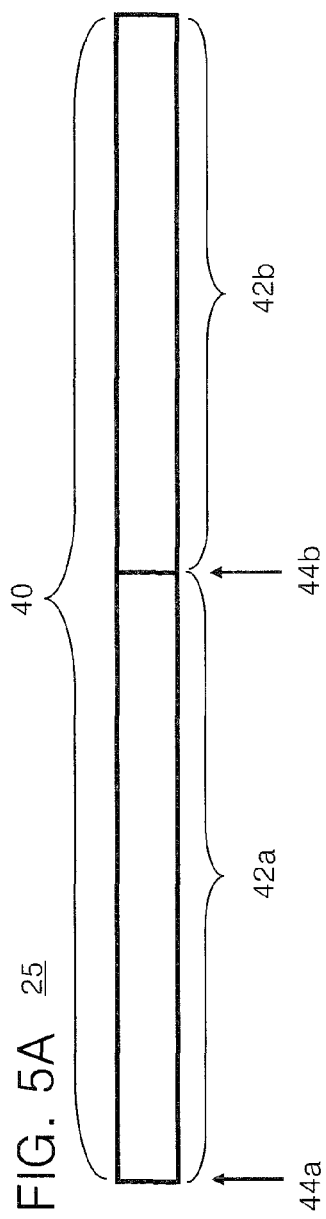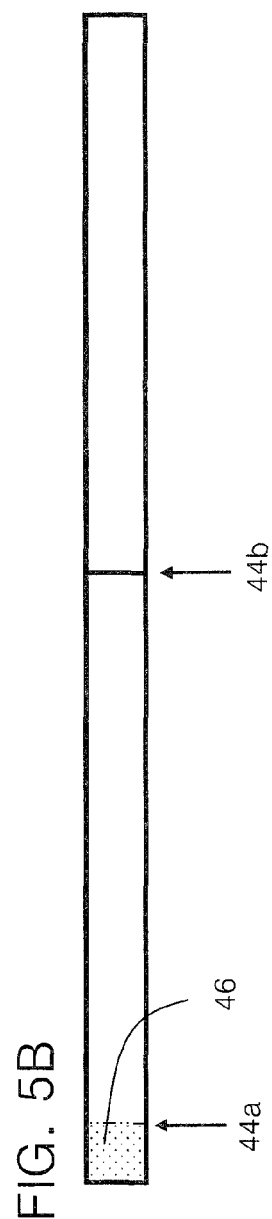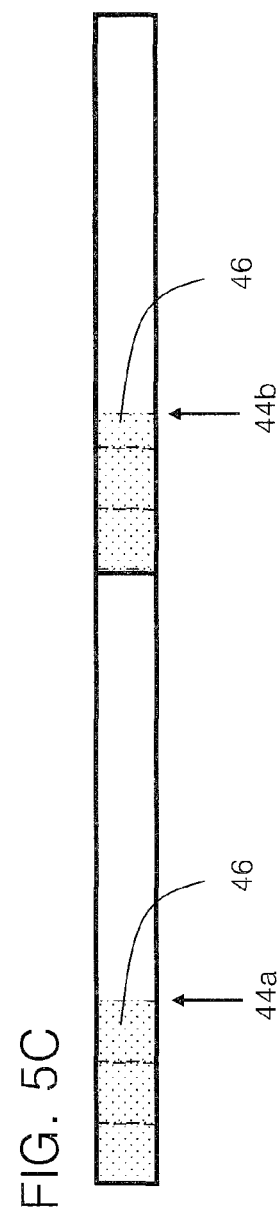

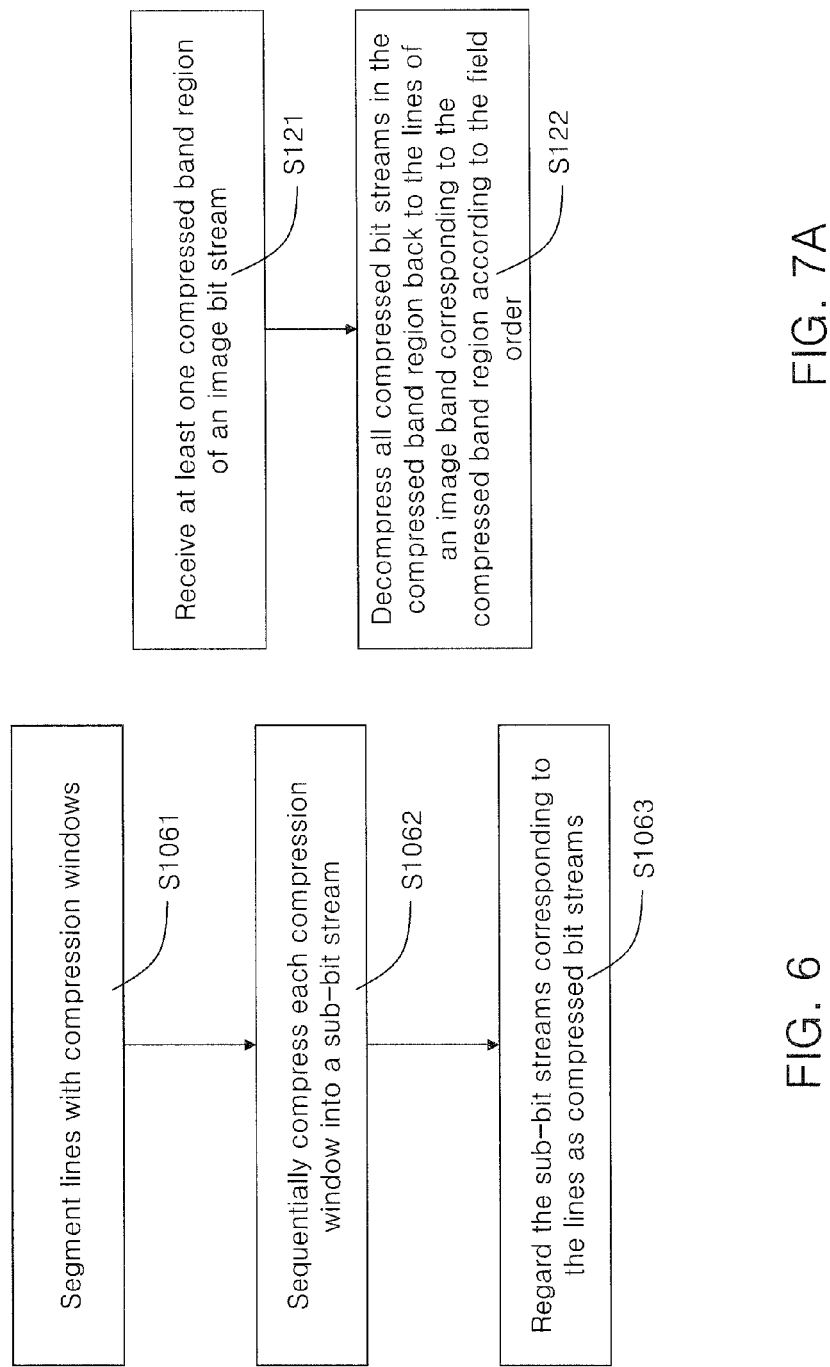

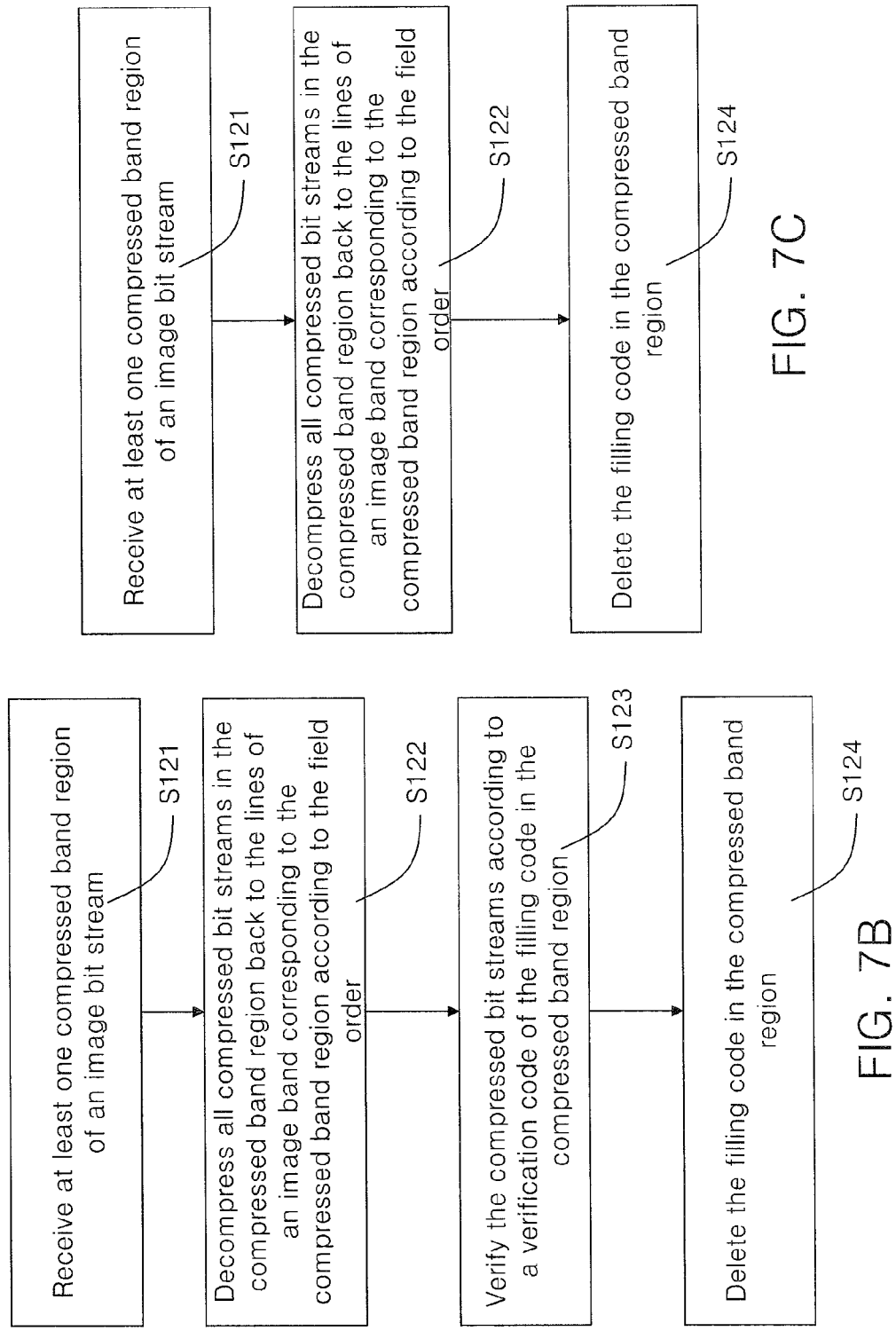

IMAGE COMPRESSION METHOD WITH FIXED COMPRESSION RATIO, IMAGE DECOMPRESSION METHOD, AND ELECTRONIC DEVICE THEREOF

CROSS-REFERENCE TO RELATED APPLICATIONS

This non-provisional application claims priority under 35 U.S.C. §119(a) on Patent Application No(s). 100123914 filed in Taiwan, R.O.C. on Jul. 6, 2011, the entire contents of which are hereby incorporated by reference.

BACKGROUND OF THE INVENTION

1. Field of the Invention

The disclosure relates to an image compression method, an image decompression method, and an electronic device thereof, and more particularly to an image compression method with a constant compression ratio used for raw data of a digital image, an image decompression method, and an electronic device thereof.

2. Related Art

In a device such as a digital camera, raw data is the original data obtained by a multi-field sensor such as a charge coupled device (CCD). An image can not be watched by a used until the raw data is processed by an image processing device. However, a size of a compressed file is difficult to be controlled due to the technologies employed for compressing the raw data, like lossless compression or not visible lossy compression. In this type of compression manner, savable space is not fixed, and the saved storage space may not be determined until actual compression is completed. Most of latest image signal processors (ISPs) perform processing in unit of image bands instead. However, the multi-field sensor does not output the raw data in a fixed order, so it is difficult to give consideration to both a field order output by the multi-field sensor and the processing in unit of image bands. Especially, it is very difficult to give consideration to both the field order and the processing in unit of image bands to define a boundary between the field and the image band in a compressed bit stream.

Moreover, even though only a part of image bands in the image are required, a most instinctive method is decoding the entire compression result back to a full resolution and then selecting a required part for further processing. This method, requires a memory capable of accommodating a full resolution image. However, decoding overhead increase due to rapid increase of the image resolution.

SUMMARY

The disclosure relates to an image compression method with a constant compression ratio, an image decompression method, and an electronic device thereof. The electronic device comprises a multi-field sensor, a memory, and a codec wrapper module. The multi-field sensor generates raw data of an image according to a field order, in which the image comprises a plurality of lines, and each line corresponds to a field index. The codec wrapper module comprises at least one encoder and at least one decoder, which execute the image compression method with the constant compression ratio and the image decompression method respectively.

The image compression method with the constant compression ratio compresses raw data of an image into an image bit stream with a predetermined ratio. The image compression method with the constant compression ratio comprises the following steps. The image is segmented into a plurality of image bands, in which each image band comprises at least one line. Storage space is allocated in the memory according to the compression ratio and a bit stream length of the raw data. The storage space is segmented into a plurality of compressed band regions according to the compression ratio and the bit stream length of the raw data, in which the compressed band regions correspond to the image bands respectively. A starting position of each compressed band region is recorded as a current ending position. The lines are sequentially received. The lines are compressed into a plurality of compressed bit streams respectively. The compressed bit streams are sequentially written into the corresponding compressed band regions through a write procedure according to the field indexes of the lines, the field order output by the multi-field sensor, and a group formed by the image bands corresponding to the lines.

The write procedure executed by the encoder may comprise the following steps. One compressed bit stream is received. The compressed bit stream is written into the corresponding compressed band region from the current ending position of the corresponding compressed band region according to the field and the image band corresponding to the compressed bit stream. When the line corresponding to the compressed bit stream is not a last line of the image band which the line belongs to, the current ending position of the corresponding compressed band region is updated. The last line of the image band which the line belongs to refers to the last line received according to the field order in the image band which the line belongs to. The write procedure may further comprise the following steps. When the line corresponding to the compressed bit stream is the last line of the image band which the line belongs to, the corresponding compressed band region is filled with a filling code after the written compressed bit stream.

The image decompression method is used to decode the image bit stream compressed by the encoder. The image decompression method comprises the following steps. At least one compressed band region of the image bit stream is received. The compressed bit streams in the compressed band region are decompressed back to the lines in the image band corresponding to the compressed band region according to the field order.

In the image decompression method, the step of decompressing the compressed bit streams in the compressed band region back to the lines in the image band corresponding to the compressed band region according to the field order may comprise the following steps. A plurality of numbers of lines respectively corresponding to fields in the compressed band region is calculated. The compressed bit streams in the compressed band region are decompressed back to the lines in the image band corresponding to the compressed band region according to the field order and the numbers of lines.

According to an embodiment of the disclosure, the electronic device may further comprise at least one memory bus and an application module. The memory bus is electrically connected between the codec wrapper module and the memory. The application module is electrically connected to the memory bus, and accesses at least one image band decompressed by the decoder through the memory bus. Moreover, the electronic device may also comprise an on-chip random access memory (OCRAM) for recording the current ending positions of the compressed band regions.

BRIEF DESCRIPTION OF THE DRAWINGS

The disclosure will become more fully understood from the detailed description given herein below for illustration only, and thus are not limitative of the disclosure, and wherein:

FIG. 5A to FIG. 5F are schematic diagrams of a memory in a write procedure according to an embodiment of the disclosure;

FIG. 6 is a flow chart of Step S106 according to an embodiment of the disclosure;

FIG. 7A is a flow chart of image decompression according to an embodiment of the disclosure;

FIG. 7B is a flow chart of image decompression according to another embodiment of the disclosure; and FIG. 7C is a flow chart of image decompression according to yet another embodiment of the disclosure.

DETAILED DESCRIPTION

Figure 1:
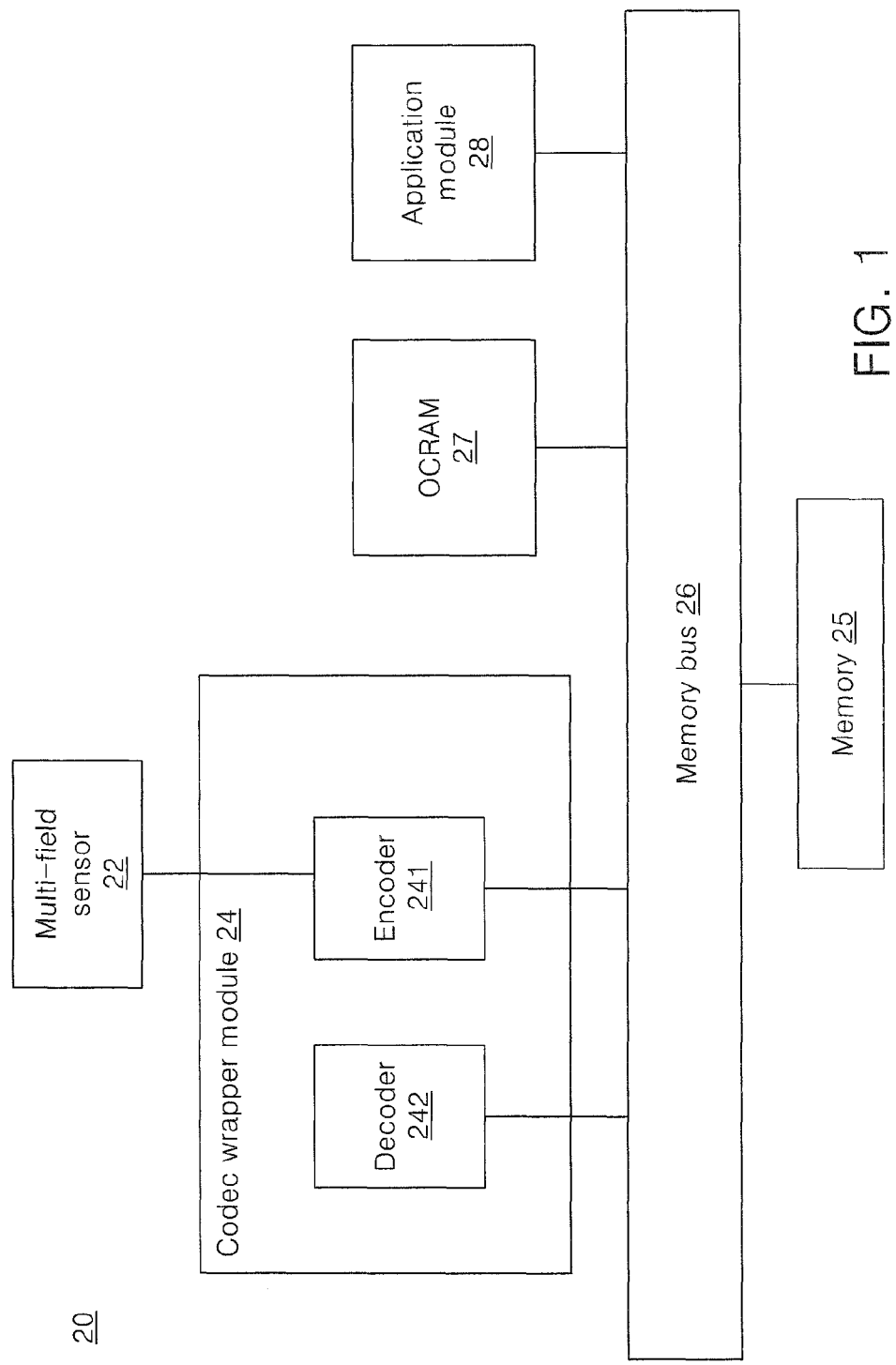
FIG. 1 is a schematic diagram of an electronic device according to an embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The disclosure provides an image compression method with a constant compression ratio, an image decompression method, and an electronic device thereof, so as to compress raw data of an image generated by a multi-field sensor into an image bit stream with a compression ratio, or decompress the image bit stream back to the raw data.

FIG. 1 is a schematic diagram of an electronic device according to an embodiment of the disclosure. First, referring to FIG. 1, the electronic device 20 comprises a multi-field sensor 22, a codec wrapper module 24, and a memory 25. The codec wrapper module 24 may comprise at least one encoder 241 for executing an image compression method with a constant compression ratio, and/or at least one decoder 242 for executing an image decompression method. The electronic device 20 may be a device capable of capturing an image and having an encoder 241 and/or a decoder 242, such as a digital camera, a mobile phone with a camera function, or a notebook computer with the camera function.

Figure 2:
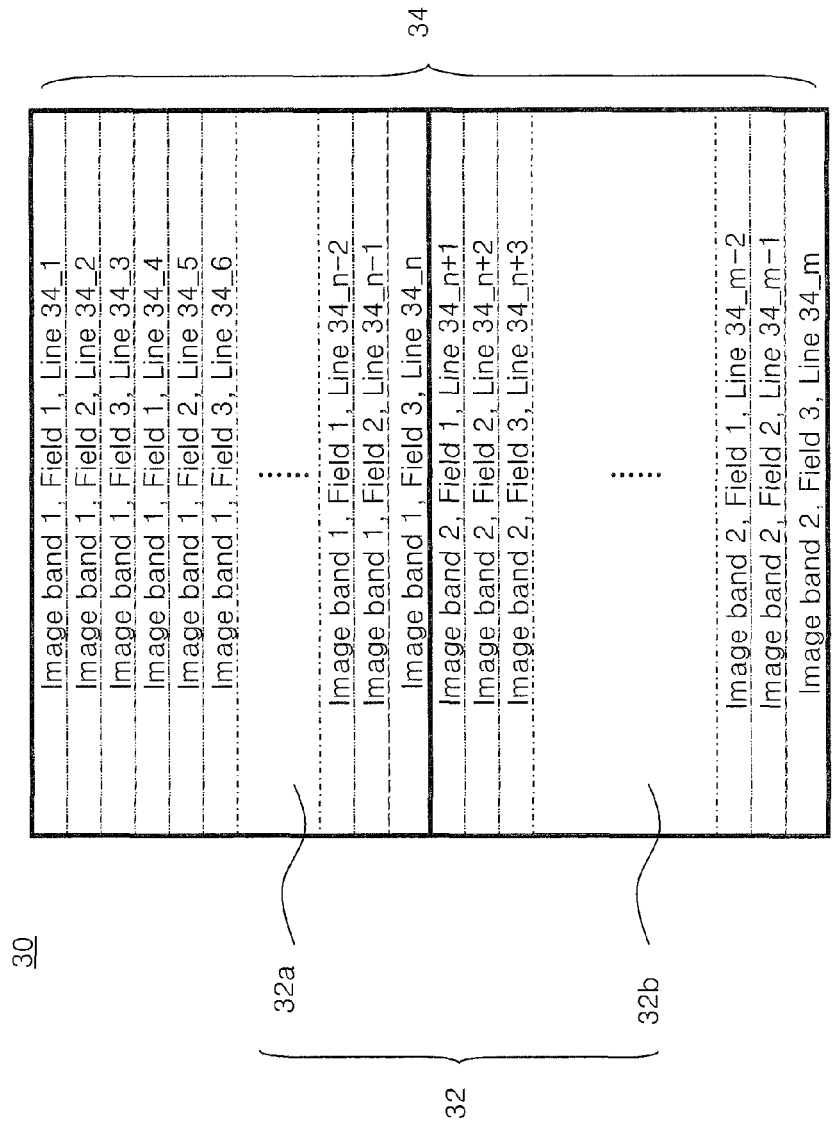
FIG. 2 is a schematic diagram of an image band according to an embodiment of the disclosure.

The multi-field sensor 22 may be, for example, a CCD, which generates raw data of an image according to a field order. FIG. 2 is a schematic diagram of an image band according to an embodiment of the disclosure. Meanwhile, referring to FIG. 2, an image 30 comprises a plurality of lines 34, and the multi-field sensor 22 outputs all the lines 34 according to the field order. Each line 34 corresponds to a field index, indicating which field the line 34 belongs to. For the embodiment of FIG. 2, the multi-field sensor 22 segments the image 30 into three fields and outputs the lines 34 in the field order being the field 1, the field 2, and the field 3. Therefore, according to the field order, the multi-field sensor 22 sequentially outputs the lines 34 in the order being 34_1, 34_4, . . . , 34_$n$-2, 34_$n$+1, . . . , 34_$m$-2, 34_2, 34_5, . . . , 34_$n$-1, 34_$n$+2, . . . , 34_$m$-1, 34_3, 34_6, . . . , 34_$n$, 34_$n$+3, . . . , and 34_$m$, in which n and m are positive integers and multiples of 3, and m is greater than n.

The above description is only exemplary and is not intended to limit the number of fields segmented by the multi-field sensor 22, the number of lines, and the output field order. The number of lines 34 corresponding to each field in one image band 32 is called the number of lines.

The memory 25 may be segmented into different areas, so as to separately store a compressed image bit stream and a decompression result of an image bit stream. The electronic device 20 may further have at least one memory bus 26 electrically connecting the codec wrapper module 24 and the memory 25. The memory 25 may be, for example, a double data rate memory (DDR memory), a dynamic random access memory (DRAM), or a Flash memory.

Figure 3:
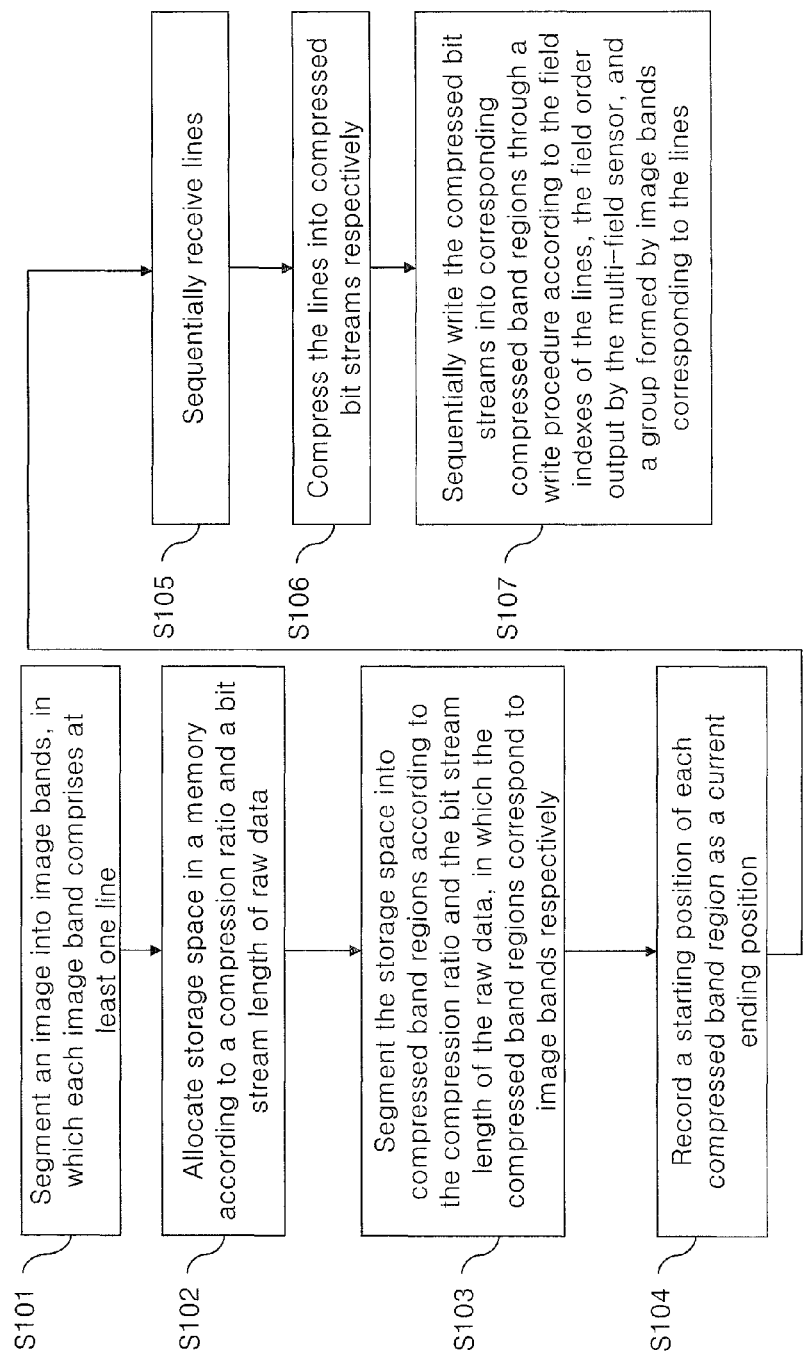
FIG. 3 is a flow chart of an image compression method with a constant compression ratio according to an embodiment of the disclosure.

FIG. 3 is a flow chart of an image compression method with a constant compression ratio according to an embodiment of the disclosure. Referring to FIG. 3, first, the image 30 is segmented into a plurality of image bands 32, in which each image band 32 comprises at least one line 34 (Step S101). For example, in FIG. 2, the image 30 is segmented into two image bands 32$a$ and 32$ba$; the lines 34_1 to 34_$n$ belong to the image band 32$a$, and the lines 34_$n$+1 to 34_$m$ belong to the image band 32$b$. However, the image 30 may also be segmented into more image bands 32.

The encoder 241 allocates storage space in the memory 25 according to a compression ratio and a bit stream length of raw data (Step S102). The storage space is segmented into a plurality of compressed band regions according to the compression ratio and the bit stream length of the raw data, in which the compressed band regions correspond to image bands 32 respectively (Step S103). The encoder 241 records a starting position of each compressed band region as a current ending position (Step S104).

The electronic device 20 may further comprise an OCRAM 27 for storing the current ending position of each compressed band region. In addition to storing the current ending position, the OCRAM 27 may be used by other modules in the electronic device 20. Moreover, one random access memory (RAM) or a plurality of registers, dedicated to storing the current ending position, may also be configured in the codec wrapper module 24 of the electronic device 20.

Then, the encoder 241 sequentially receives all lines 34 from the multi-field sensor 22 (Step S105), and compresses the lines 34 into a plurality of compressed bit streams respectively (Step S106). According to the field index of each line 34, the field order output by the multi-field sensor 22, and a group formed by image bands 32 corresponding to the line 34, the encoder 241 sequentially writes the compressed bit streams into corresponding compressed band regions through a write procedure (Step S107). In particular, the codec wrapper module 24 repetitively receives one line 34, compresses the line 34 into the compressed bit stream, and writes the compressed bit stream into the compressed band region through the write procedure, until the whole raw data is compressed and written into the storage space and becomes the image bit stream. The image bit stream is data in the storage space filled with the compressed bit stream and a filling code.

Figure 4:
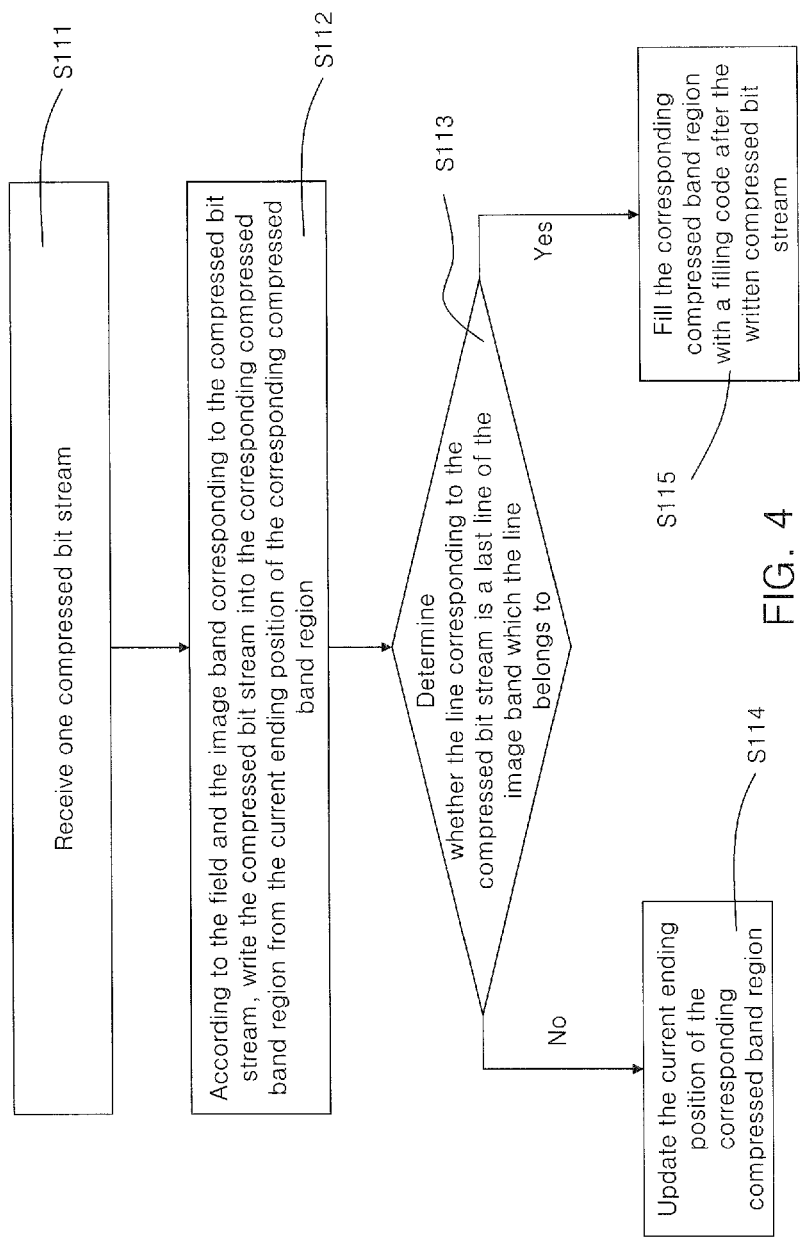
FIG. 4 is a flow chart of a write procedure according to an embodiment of the disclosure.

FIG. 4 is a flow chart of a write procedure according to an embodiment of the disclosure. Through the write procedure, one compressed bit stream is received (Step S111), and according to the field and the image band 32 corresponding to the compressed bit stream, the compressed bit stream is written into the corresponding compressed band region from the current ending position of the compressed band region corresponding to the image band 32 (Step S112). In other words, through the write procedure, the field index and the image band 32 which the line 34 compressed into the compressed bit stream belongs to are determined.

According to an embodiment of the disclosure, Step S112 may involve according to the field order and the number of lines 34 corresponding to each field, calculating the field corresponding to the compressed bit stream (that is, the field index); and according to the number of lines 34 in each image band 32 and the number of lines 34 corresponding to each field, calculating the image band 32 corresponding to the compressed bit stream.

After the compressed bit stream is written, through the write procedure, it is determined whether the line 34 corresponding to the compressed bit stream is a last line 34 of the image band 32 which the line 34 belongs to (Step S113). The last line 34 of the image band 32 which the line 34 belongs to refers to the last line 34 scanned and received according to the field order in the image band 32 which the last line 34 belongs to. When the line 34 corresponding to the compressed bit stream is not the last line 34 of image band 32 which the line 34 belongs to, the current ending position of the corresponding compressed band region is updated (Step S114). When the line 34 corresponding to the compressed bit stream is the last line 34 of the image band 32 which the line 34 belongs to, the corresponding compressed band region is filled with the filling code after the written compressed bit stream (Step S115).

In Step S115, the codec wrapper module 24 determines whether the compressed band region has remaining space after a last compressed bit stream is written in the compressed band region. If yes, the codec wrapper module 24 supplements the filling code. Therefore, a compressed bit stream of a line 34 first scanned according to the field order in one image band 32 is stored in a starting position of each compressed band region.

An image content of the line 34 affects a compression result, so a length of the filling code in each compressed band region may be different. All bits of the filling code may have the same value, for example, 0 or 1. The values of the filling code may also be different. The filling code may also be an appended verification code of the compressed bit stream, for example, a check sum of the corresponding compressed bit stream.

Referring to FIG. 4, and FIG. 5A to FIG. 5F, FIG. 5A to FIG. 5F are schematic diagrams of a memory in a write procedure according to an embodiment of the disclosure.

As shown in FIG. 5A, after Step S104, the storage space 40 in the memory 25 is segmented into compressed band regions 42a and 42b (collectively called compressed band regions 42 hereafter) according to the image bands 32a and 32b. Starting positions of the compressed band regions 42a and 42b are recorded as the current ending positions 44a and 44b (collectively called current ending positions 44 hereafter) corresponding to the compressed band regions 42a and 42b. The starting positions of the compressed band regions 42a and 42b may be obtained by calculating sizes of the compressed band regions 42a and 42b and a starting position of the storage space 40.

The field order is the field 1, the field 2 and the field 3, so a first compressed bit stream 46 received through the write procedure corresponds to a first line 34_1 of the image 30, and belongs to a first image band 32a and the field 1. Through the write procedure, the compressed bit stream 46 is written into the compressed band region 42a corresponding to the image band 32a, and the current ending position 44a of the compressed band region 42a is updated to be a next bit position of the compressed bit stream 46, as shown in FIG. 5B.

The encoder 241 sequentially writes the compressed bit streams 46 corresponding to the lines 34_1, 34_4, . . . , 34_n−2 into the compressed band region 42a, and updates and saves the current ending position 44a of the compressed band region 42a respectively. When the compressed bit stream 46 corresponding to the line 34_n+1 is received through the write procedure, it may be known in Step S112 that the compressed bit stream 46 belongs to the image band 32b. Therefore, the compressed bit stream 46 corresponding to the line 34_n+1 is written into the compressed band region 42b according to the current ending position 44b, as shown in FIG. 5C.

It should be noted that, the encoder 241 sequentially compresses and writes all lines 34 belonging to the field 1 in the image band 32a into the compressed band region 42a, then sequentially compresses and writes all lines 34 belonging to the field 1 in the image band 32b into the compressed band region 42b, and then sequentially writes the lines into the corresponding compressed band region 42 according to the field order.

Figure 5D:
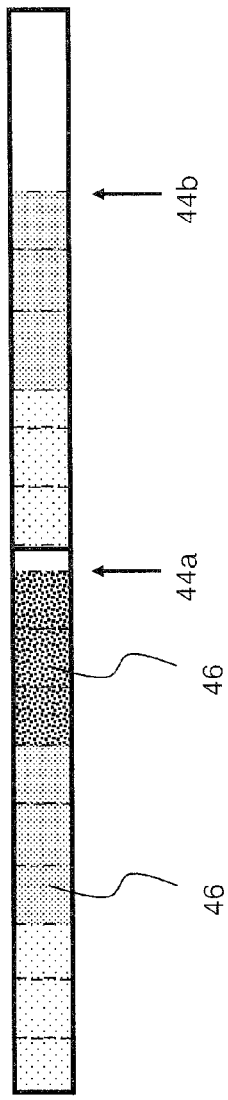
Figure 5E:
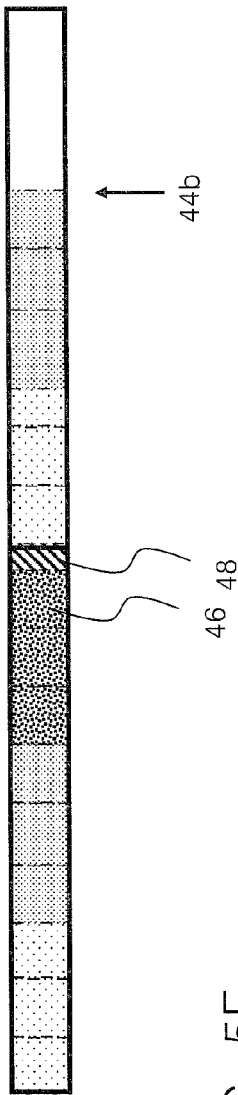
Figure 5F:
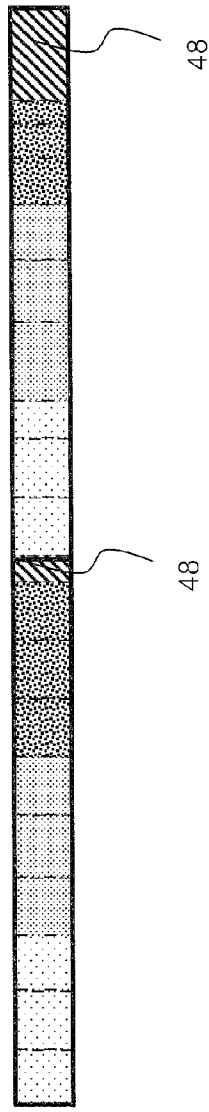

According to the above steps, after processing all lines 34 having the field index of 3 in the image band 32a, the codec wrapper module 24 writes a filling code 48. Then, the encoder 241 processes the lines 34 corresponding to the field index of 3 in the image band 32b, as shown in FIG. 5D, FIG. 5E, and FIG. 5F.

FIG. 6 is a flow chart of Step S106 according to a different embodiment of the disclosure. Referring to FIG. 6, according to an embodiment of the disclosure, Step S106 may comprise: segmenting lines 34 with a plurality of compression windows (Step S1061); sequentially compressing each compression window into a sub-bit stream (Step S1062); and regarding the sub-bit streams corresponding to the lines 34 as compressed bit streams 46 (Step S1063).

FIG. 7A is a flow chart of image decompression according to an embodiment of the disclosure. Referring to FIG. 7A, the decoder 242 may receive at least one compressed band region 42 of an image bit stream from the memory 25 (Step S121), and then decompress all compressed bit streams 46 in the compressed band region 42 back to all lines 34 of an image band 32 corresponding to the compressed band region 42 according to a field order (Step S122).

The electronic device 20 may further comprise at least one application module 28. The application module 28 may obtain the image band 32 decompressed by the decoder 242 through memory bus 26, and display the image band 32 or perform various kinds of digital image processing (DIP) on the image band 32. The decoder 242 may provide a single image band 32, so the application module 28 can come into operation before the whole image bit stream is decoded.

According to an embodiment of the disclosure, Step S122 may comprise: calculating the number of lines respectively corresponding to the field in the compressed band region 42; and according to the field order and the number of lines, decompressing all compressed bit streams 46 in the compressed band region 42 back to all lines 34 in the image band 32 corresponding to the compressed band region 42.

According to another embodiment of the disclosure, when each line 34 is compressed with a plurality of compression windows, Step S122 may comprise: according to the field order and the number of lines, decompressing the sub-bit stream in the compressed bit stream 46 back to the corresponding compression window as the line 34 in the image band 32 corresponding to the compressed band region 42.

FIG. 7B and FIG. 7C are flow charts of image decompression according to different embodiments of the disclosure. Referring to FIG. 7B and FIG. 7C, if the decoder 242 finds the filling code 48 after decompressing all the compressed bit streams 46, the decoder 242 can directly delete the filling code 48 in the compressed band region 42 (Step S124). If the filling code 48 is a verification code corresponding to the compressed band region 42, the decoder 242 may first verify whether the compressed bit streams 46 in the compressed band region 42 are correct according to the filling code 48 in the compressed band region 42 (Step S123), and then delete the filling code 48.

To sum up, the encoder compresses the raw data of the image with the compression ratio, thereby ensuring that enough storage space and memory access bandwidth are saved by the compressed image bit stream. Through the technology of preserving the compressed band region and appending the filling code, the encoder can write all lines corresponding to the same image band into the same compressed band region regardless of the field order. When only any one of the image bands in the whole image needs to be decompressed, the whole image bit stream does not need to be decompressed, but only the compressed band region corresponding to the required image band needs to be decoded. Therefore, the image compression method with the constant compression ratio solves the problem in the prior art that consideration is difficult to be given to both the field order and the image band boundary.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. An image compression method with a constant compression ratio, for raw data compression of an image generated by a multi-field sensor into an image bit stream with a compression ratio, wherein the image comprises a plurality of lines, the multi-field sensor outputs the lines according to a field order, and each line corresponds to a field index, the method comprising:
   segmenting the image into a plurality of image bands, wherein each image band comprises at least one line;
   allocating storage space in a memory according to the compression ratio and a bit stream length of the raw data;
   segmenting the storage space into a plurality of compressed band regions according to the compression ratio and the bit stream length of the raw data, wherein the compressed band regions correspond to the image bands respectively;
   recording a starting position of each compressed band region as a current ending position;
   sequentially receiving the lines;
   compressing the lines into a plurality of compressed bit streams respectively; and
   sequentially writing the compressed bit streams into the corresponding compressed band regions through a write procedure according to the field indexes of the lines, the field order output by the multi-field sensor, and a group formed by the image bands corresponding to the lines.

2. The image compression method with the constant compression ratio according to claim 1, wherein the write procedure comprises:
   receiving a compressed bit stream;
   writing the compressed bit stream into the corresponding compressed band region from the current ending position of the corresponding compressed band region according to a field and the image band corresponding to the compressed bit stream; and
   when the line corresponding to the compressed bit stream is not a last line of the image band which the line belongs to, updating the current ending position of the corresponding compressed band region.

3. The image compression method with the constant compression ratio according to claim 2, wherein the write procedure further comprises:
   when the line corresponding to the compressed bit stream is the last line of the image band which the line belongs to, filling the corresponding compressed band region with a filling code after the written compressed bit stream.

4. An image decompression method, comprising:
   receiving at least one of compressed band regions of an image bit stream, wherein the image bit stream is produced by compressing raw data of an image generated by a multi-field sensor with a compression ratio, and wherein the compressed band regions are generated by segmenting a storage space in a memory according to the compression ratio and a bit stream length of the raw data; and
   decompressing compressed bit streams in the compressed band region back to lines in one of image bands corresponding to the compressed band region according to a field order, wherein the image bands are generated by segmenting the image, and correspond to the compressed band regions respectively.

5. The image decompression method according to claim 4, wherein the step of decompressing the compressed bit streams in the compressed band region back to the lines in the image band corresponding to the compressed band region according to the field order comprises:
   calculating a plurality of numbers of lines respectively corresponding to fields in the compressed band region; and
   decompressing the compressed bit streams in the compressed band region back to the lines in the image band corresponding to the compressed band region according to the field order and the numbers of lines.

6. An electronic device, comprising:
   a multi-field sensor, for generating raw data of an image according to a field order, wherein the image comprises a plurality of lines, and each line corresponds to a field index;
   a memory; and
   a codec wrapper module, comprising:
      at least one encoder, for compressing the raw data of the image into an image bit stream with a compression ratio, wherein the encoder executes the following steps:
         segmenting the image into a plurality of image bands, wherein each image band comprises at least one line;
         allocating storage space in the memory according to the compression ratio and a bit stream length of the raw data;
         segmenting the storage space into a plurality of compressed band regions according to the compression ratio and the bit stream length of the raw data, wherein the compressed band regions correspond to the image bands respectively;
         recording a starting position of each compressed band region as a current ending position;
         sequentially receiving the lines;
         compressing the lines into a plurality of compressed bit streams respectively; and
         sequentially writing the compressed bit streams into the corresponding compressed band regions through a write procedure according to the field indexes of the lines, the field order output by the multi-field sensor, and a group formed by the image bands corresponding to the lines; and at least one decoder, for decoding the image bit stream, wherein the encoder executes the following steps:
receiving at least one compressed band region of the image bit stream; and
decompressing the compressed bit streams in the compressed band region back to the lines in the image band corresponding to the compressed band region according to the field order.

7. The electronic device according to claim 6, further comprising:
at least one memory bus, electrically connected between the codec wrapper module and the memory; and
at least one application module, electrically connected to the memory bus, and for accessing the at least one image band decompressed by the decoder through the memory bus.

8. The electronic device according to claim 6, further comprising:
an on-chip random access memory (OCRAM), for recording the current ending positions of the compressed band regions.

9. The electronic device according to claim 6, wherein the write procedure executed by the encoder comprises:
receiving one compressed bit stream;
writing the compressed bit stream into the corresponding compressed band region from the current ending position of the corresponding compressed band region according to the field and the image band corresponding to the compressed bit stream; and
when the line corresponding to the compressed bit stream is not a last line of the image band which the line belongs to, updating the current ending position of the corresponding compressed band region.

10. The electronic device according to claim 9, wherein the write procedure further comprises:
when the line corresponding to the compressed bit stream is the last line of the image band which the line belongs to, filling the corresponding compressed band region with a filling code after the written compressed bit stream.

11. The electronic device according to claim 6, wherein the step executed by the decoder of decompressing the compressed bit streams in the compressed band region back to the lines in the image band corresponding to the compressed band region according to the field order comprises:
calculating a plurality of numbers of lines respectively corresponding to fields in the compressed band region; and
decompressing the compressed bit streams in the compressed band region back to the lines in the image band corresponding to the compressed band region according to the field order and the numbers of lines.

* * * * *